United States Patent [19]

Papenhagen et al.

[11] Patent Number: 5,806,376
[45] Date of Patent: Sep. 15, 1998

[54] CONTROL PEDAL UNIT FOR VEHICLES

[75] Inventors: Dieter Papenhagen, Waiblingen; Thosten Meyer, Fellbach; Manfred Löchle, Stuttgart, all of Germany

[73] Assignee: Mercedes-Benz AG, Stuttgart, Germany

[21] Appl. No.: 692,500

[22] Filed: Aug. 5, 1996

[30] Foreign Application Priority Data

Aug. 29, 1995 [DE] Germany .......................... 195 31 735.1

[51] Int. Cl.⁶ ..................................................... G05G 1/14
[52] U.S. Cl. ................................................. 74/513; 74/560
[58] Field of Search ............................. 74/512, 513, 514, 74/560

[56] References Cited

U.S. PATENT DOCUMENTS

| 3,888,219 | 6/1975 | Rogerson | 74/513 X |
| 4,424,890 | 1/1984 | Duethman | 74/512 X |

FOREIGN PATENT DOCUMENTS

| 0 141 947 | 5/1985 | European Pat. Off. . |
| 0 430 600 | 6/1991 | European Pat. Off. . |
| 27 28 787 | 1/1979 | Germany . |
| 28 15 769 | 10/1979 | Germany . |
| 6-156110 | 6/1994 | Japan . |

Primary Examiner—Charles A. Marmor
Assistant Examiner—Mary Ann Battista
Attorney, Agent, or Firm—Klaus J. Bach

[57] ABSTRACT

In a vehicle control pedal unit comprising a mounting structure having a U-shaped mounting end with spaced parallel legs between which one end of a pedal lever having an eyepiece with an opening receiving a bearing sleeve is pivotally supported and a pedal is attached to the other end, at least one connecting cable having one end attached to the pedal lever at its outside extends into the eyepiece and around the bearing sleeve and and again to the outside of the lever and a return spring which is connected to the other end of the connecting cable is attached under tension to the mounting structure for biasing the pedal lever into an idle end position.

8 Claims, 5 Drawing Sheets

CONTROL PEDAL UNIT FOR VEHICLES

BACKGROUND OF THE INVENTION

The invention relates to a control pedal unit for vehicles with a pedal lever which is pivotally supported by a bearing structure and provided with a return spring effective on the pedal lever.

EP 04 30 600 B1 discloses a control pedal unit for vehicles with a pedal attached to a pedal lever which is provided with a spiral return spring for returning the pedal lever to engine idle position.

Pedal units of this type are further shown in DE OS 28 15 769 and in DE OS 27 28 787. In both cases, the pedal lever is mounted on a support structure on a vehicle wall.

However, all these pedal units are relatively complicated in their designs and mounting them is correspondingly complicated. This is particularly true for the arrangement of the return spring and its connection to the control pedal parts.

It is therefore the principal object of the present invention to provide a pedal unit without the disadvantages mentioned above, particularly a pedal unit, which is suitable to be manufactured efficiently in series and which can be preassembled together with the return spring.

Also, the control pedal unit should be suitable for transmitting control impulses to the internal combustion engine electronically or electrically instead of via a mechanical control cable.

SUMMARY OF THE INVENTION

In a vehicle control pedal unit comprising a mounting structure having a U-shaped mounting end with spaced parallel legs between which one end of a pedal lever having an eyepiece with an opening receiving a bearing sleeve is pivotally supported and a pedal is attached to the other end, at least one connecting cable having one end attached to the pedal lever at its outside extends into the eyepiece and around the bearing sleeve and and again to the outside of the lever and a return spring which is connected to the other end of the connecting cable is attached under tension to the mounting structure for biasing the pedal lever into an idle end position.

The control pedal unit according to the invention can be largely pre-assembled. Even the return spring and associated operating cable connected thereto can be preinstalled so that the required return forces are provided already during pre-assembly of the unit. The associated operating cable extends around the pedal lever support shaft so that it acts as a friction brake to provide a particular driver feel which is especially important if the pedal position information is transmitted to the engine by electronic or electric pulses rather than by way of a control cable connection.

If, in accordance with a particularly a advantageous embodiment, the operating cable forms a loop disposed in a groove extending in a partial circle about the inner circumferential wall, that is, the bearing wall of the bearing support shaft, the return spring can be pre-assembled rapidly while insuring that it is properly positioned after assembly.

Advantageous embodiments of the invention are described below on the basis of the accompanying drawings.

DESCRIPTION OF A PREFERRED EMBODIMENT

Figure 1:
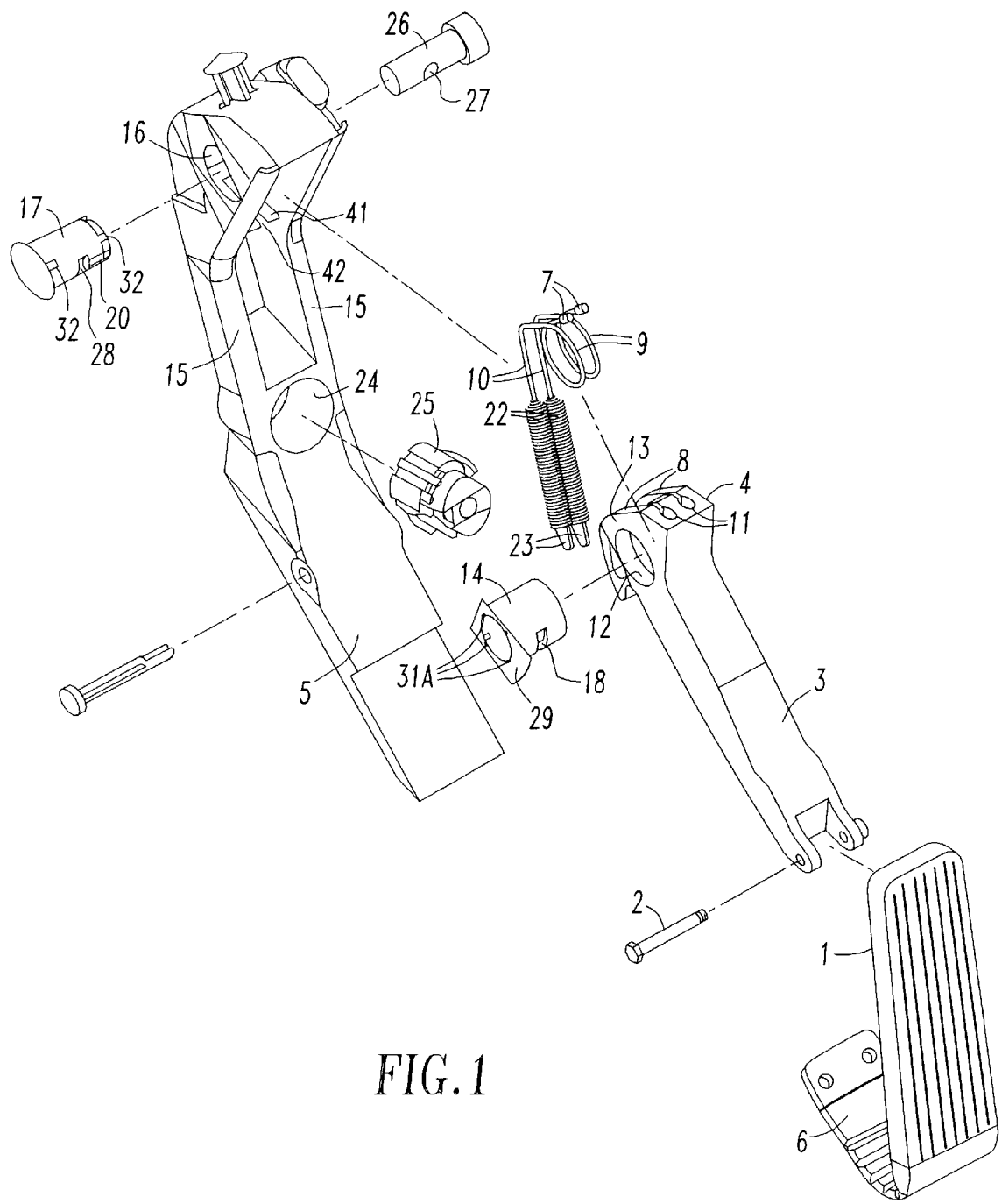
FIG. 1 is an exploded view of a control pedal unit according to the invention.

The vehicle control pedal unit includes a control pedal 1 which is connected to a pedal lever 3 by means of a hinge pin 2 in a well known manner. The pedal lever 3 has at its end opposite its hinge connection with the control pedal 1, an eyepiece 4 by which it is pivotally supported on a mounting structure 5 which is formed as a separate part. After the pedal unit is completely assembled the mounting structure 5 can be mounted as a preassembled unit onto a vehicle wall. If desired, the pedal 1 may include at its end remote from its connection to the pedal lever 3, a hinge portion 6 which is connected to the mounting structure 5.

The eye piece 4 is provided with partial circumferential slots 8 disposed side-by-side in parallel relationship and extending over part of the outer wall of the eye piece 4 for receiving the end portion of connecting cables 10. The end of each connecting cable 10 forms a loop 9. By way of the loop 9 each connecting cable 10 passes from the outside, via a partially circumferential slot 8, to the inside of the eyepiece 4, that is into the eyepiece opening. The inner circumferential wall that is the wall defining the opening of the eyepiece 4 includes two circumferential grooves 12 which are in radial alignment with the partially circumferential slots 8. The two loops 9 of the connecting cables 10 are placed into the two circumferential grooves 12. The ends of the connecting cables 10 are provided with nipples 7 which are received and retained in corresponding cavities 11 formed in the outer circumferential wall of the eyepiece 4.

The portions of the connecting cables 10 extending from the partial circumferential slots 8 are retained in guide slots formed in a rear portion of the eyepiece 4 which projects in the form of a cam structure 13. After being guided over the cam structure 13, the two connecting cables 10 are attached to the return springs 22 or the return springs are integrally formed with the connecting cable 10. The return springs 22 have, at their free ends, hooks 23 by which they are connected to the mounting structure 5, that is, by which the return springs are engaged with the mounting structure 5 in a manner to be described below.

The cam structure 13 is formed so as to have different radii over its extent whereby different lever arms are obtained for the actuating forces of the springs 22 effective on the pedal lever 3. The cam structure shape is so selected as to provide for the vehicle operator a pedal position-dependent, that is, a vehicle speed-dependent pedal feel.

After placement of the cable loops 9 into the inner circumferential grooves 12, a stationary bearing sleeve 14 is inserted into the eyepiece 4. The bearing sleeve 14 forms a friction sleeve between the loops 9 and the inner circumferential wall that is, the bearing opening of the eyepiece 4 of the pedal lever 3.

The bearing sleeve 14 has an axial length which exceeds slightly the width of eyepiece 4. In this way, it is clamped between the legs 15 of the mounting structure 5 which at least in the area in which the lever 3 is mounted, has the cross-sectional shape of a U. The sleeve 14 is therefore firmly retained between the legs 15 without any play.

After the bearing sleeve 14 is positioned between the legs 15 of the mounting structure 5 so as to be in axial alignment with a bearing opening 16 in one of the legs 15 of the mounting structure 5, a slide hub 17 is inserted into the bearing sleeve 14 through the bearing opening 16.

For the accurate positioning of a window 18 formed in the bearing sleeve 14 through which a carrier pin 19 (FIG. 2) is inserted, the bearing sleeve 14 is provided, at its front end, with a frame-like positioning flange 29 by which the bearing sleeve 14 is properly located such that, during assembly of the bearing sleeve 14 and the pedal lever 3, the window 18 is in the proper position for inserting the carrier pin 19.

In order to insure that the bearing sleeve 14 is retained in its proper position in which its functional features are properly coordinated with features of adjacent components the slide hub 17 is provided with projections 20 and with stubs 32 and the projections are additionally provided with engagement lugs 20A.

Figure 3:
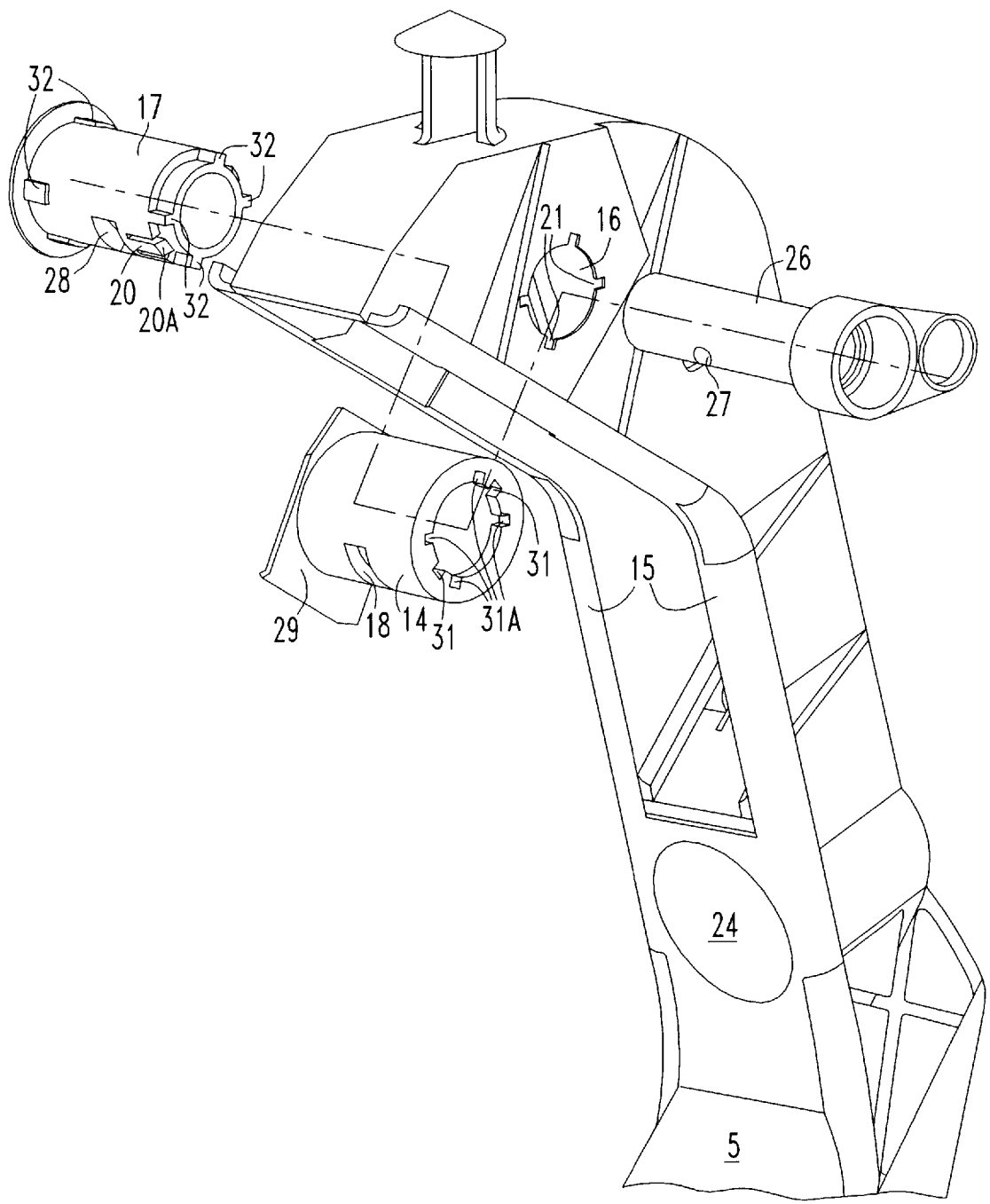
FIG. 3 is an enlarged view of the bearing portion supporting the pedal lever with the associated components.

The inner end wall of the bearing sleeve 14 and the inner leg wall of the mounting structure 5 are provided, around the bearing opening 16, with cutouts 21 and 31A (FIG. 3) which are adapted in size to the size of the stubs 32. For the interconnection of the pedal lever 3 and the mounting structure 5, the slide hub 17 can be inserted, during assembly, through the bearing opening 16 into the bearing sleeve 14 only in a predetermined angular position in which the projections 20 are received in the corresponding asymmetrically arranged cutouts 31 in the bearing sleeve 14 in which they are lockingly engaged. When the parts are assembled the stubs 32 are disposed in the cutouts 31A of the bearing sleeve 14 and also in the cutouts 21 of the bearing opening 16. In this way the bearing sleeve 14 as well as the slide hub 17 are firmly connected with the mounting structure 5 so as to be stationary.

The mounting structure 5 is provided with a recess 24 for the reception of a kickdown switch 25 used in connection with vehicles with automatic transmissions.

Figure 2:
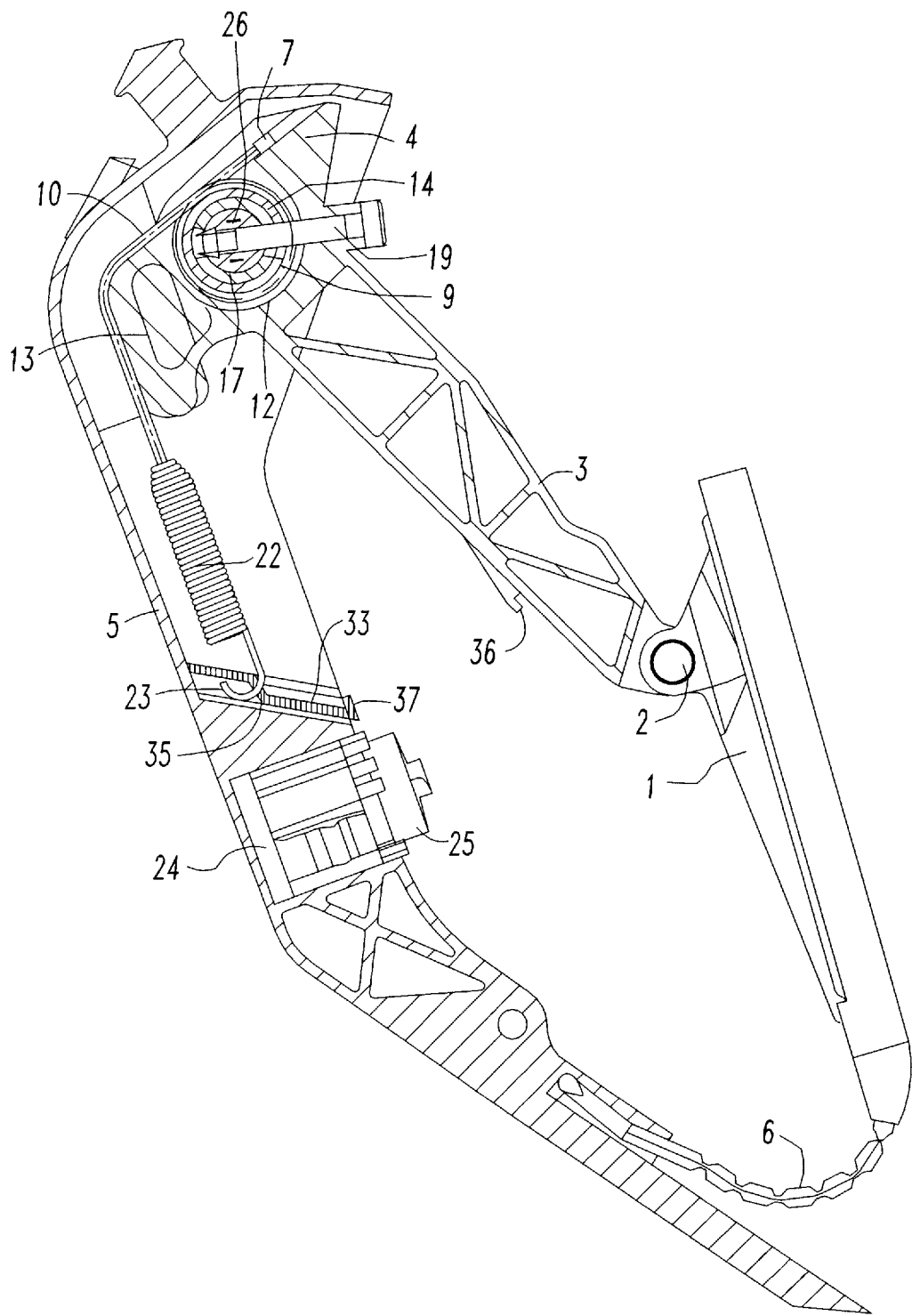
FIG. 2 is a side view of the control pedal unit of FIG. 1 shown partially in section.

The control pedal unit as shown in FIG. 2 is designed for electronic or electrical communication with the vehicle engine. For this reason, a sender shaft 26 is inserted into the slide hub at the end thereof opposite the insertion end. The sender shaft may be a drive shaft for a potentiometer or a Hall sender capable of transmitting the position of the sender shaft 26 and, consequently, of the control pedal 1 electrically or electronically to the vehicle engine for controlling the engine. For this purpose, the carrier pin 19 mounted in a bore in the pedal lever 3 is provided. The carrier pin 19 may be threaded into a threaded bore 27 or it may be otherwise engaged in the bore so as to be firmly mounted to the sender shaft 26. The slide hub 17 includes a window 28 which is in radial alignment with the window 18 in the bearing sleeve 14 and the carrier pin extends through the windows and is firmly connected to the pedal lever for movement therewith. The size of the two windows 18 and 28 is so selected that the carrier pin 19 and consequently the pedal lever 3 are freely movable between an upper stop which represents the idle position of the pedal lever and a lower stop which represents the full load position of the pedal lever.

The slide hub 17 serves two purposes: to mount the bearing sleeve 14 so that it is firmly located and to close the bearing sleeve 14 as it is held in the bearing sleeve in a simple manner by an engagement lock or by a clip connection and it serves as a friction bearing structure for the sender shaft 26.

Figure 4:
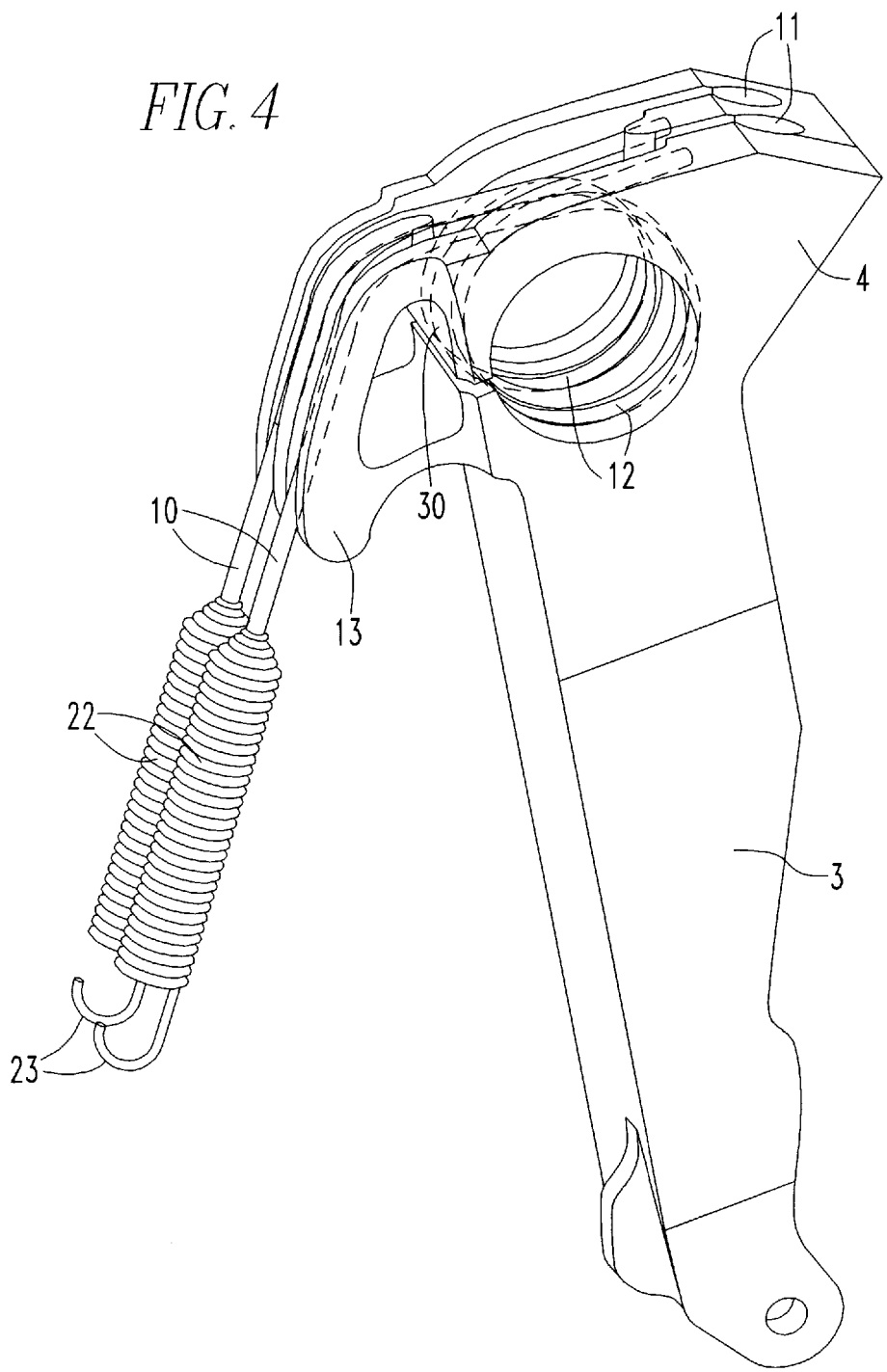
FIG. 4 is a perspective view of the pedal lever with return springs mounted thereon.

An expansion slot 30 extending axially in the eyepiece 4 (see FIG. 4) serves for the accommodation of tolerances which permits dimensioning the bearing components for zero play.

The two hooks 23 of the return springs 22 are received in an ear or a bore in a transverse wall 33 of the mounting structure so that the return springs 22 are pretensioned.

Figure 5:
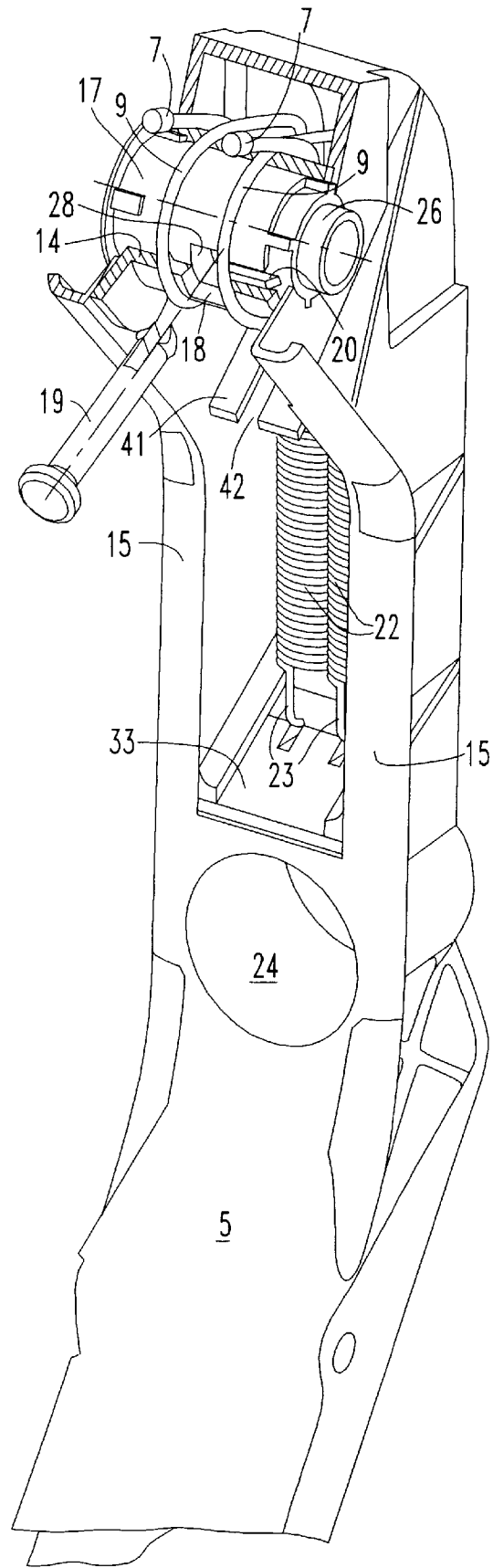
FIG. 5 is a partially perspective view of the pedal lever support structure shown without the pedal lever but with premounted return springs and partially sectionalized to show the pedal lever pivot support structure.

Between the two legs 15 of the mounting structure 5, there is a slotted wall 41 (shown in FIGS. 1 and 5) which extends between the return springs 22 and the bearing portion or the pivot shaft of the pedal lever 3. The slotted wall 41 includes two spaced slots 42 of only such a width that the connecting cables can pass therethrough. As a result, the two return springs 22 are disposed between the transverse wall 33 and the slotted wall 41. If a return spring breaks, the control pedal unit remains operational since the broken spring 22 is retained in position and cannot come into the path of the pedal lever 3.

The invention is not restricted to the exemplary embodiments described herein. It is for example, possible to use a mounting structure 5 wherein the control pedal is mounted on the pedal lever 3 and is not hinged at the lower end to the mounting structure or the vehicle floor.

What is claimed is:

1. A control pedal unit for vehicles comprising a mounting structure having a U-shaped mounting end with spaced parallel leg walls, a pedal lever having an eyepiece with an opening at one end where said pedal lever is pivotally supported between the leg walls of said mounting structure and a pedal attached to its other end, a bearing sleeve received in said eyepiece opening and disposed between said mounting structure leg walls providing for a bearing structure, at least one connecting cable having one end attached to said pedal lever and extending between an inner circumferential wall of said eyepiece and said bearing sleeve at least partially around said bearing sleeve and being accommodated in a groove formed in the inner circumferential wall of said eyepiece, and a return spring extending from the other end of said connecting cable and being attached, under tension, to said mounting structure for biasing said pedal lever into an idle end position.

2. A control pedal unit according to claim 1, wherein a slotted wall is disposed between said walls of said mounting structure at a side of said eyepiece opening opposite from where said cable is connected to said pedal lever, said cable extending through a slot formed in said slotted wall, said slotted wall retaining said spring in position if said spring or said cable breaks.

3. A control pedal unit according to claim 1, wherein said connecting cable is attached to said pedal lever in an outer area of said eyepiece and said eyepiece includes a partial circumferential slot receiving said cable, said cable extending to an interior area of said eyepiece and forming a loop extending at least partially around said bearing sleeve and then again to the outer area of said eyepiece where it is guided to said return spring.

4. A control pedal unit according to claim 1 wherein said connecting cable extends over an area of said eyepiece which projects in the form of a cam shaped in such a way that, upon pivoting of said pedal lever, different lever arm lengths are provided for the action of said spring on said pedal lever.

5. A control pedal unit according to claim 1 wherein said one end of said cable is provided with a nipple received in a cavity formed in said eyepiece for attachment to said pedal lever.

6. A control pedal unit according to claim 1, wherein a slide hub extends through said eyepiece opening and said bearing sleeve and is engaged with said leg walls firmly retaining said bearing sleeve in position between said leg walls.

7. A control pedal unit according to claim 6 wherein said bearing sleeve and said slide hub have circumferential windows disposed in radial alignment and a position sender shaft with signal generating means is disposed in said slide hub for providing electrical signals indicative of the angular position of said pedal lever to an electronic engine control system, and a carrier pin extends from said sender shaft through said windows and is connected to said pedal lever to rotate said position sender shaft with said pedal lever.

8. A control pedal unit according to claim 7 wherein said bearing sleeve has a frame-like flange which is engaged with said slide hub by means of interlocking projections and cutouts for accurately positioning said slide hub and said bearing sleeve relative to one another such that said windows are arranged in radial alignment.

\* \* \* \* \*